No. 11,966. Reissued Feb. 4. 1902.
E. S. CUSHMAN.
COOLING CAN.
(Application filed Nov. 30, 1901.)
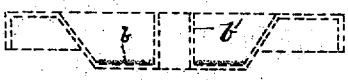
Fig. 1
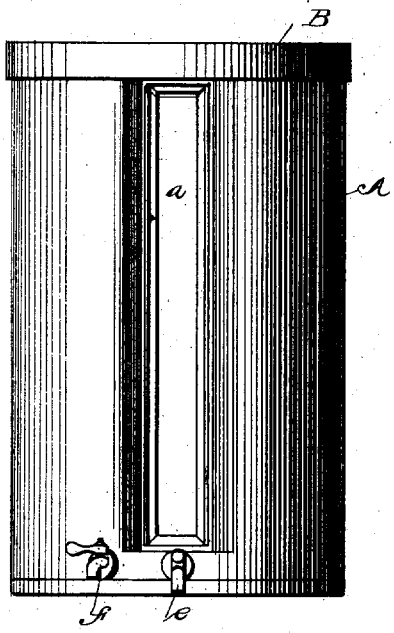
Fig. 2.
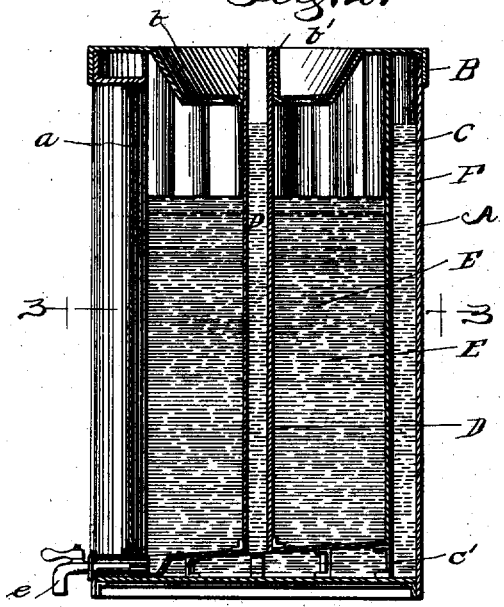
Fig. 4.
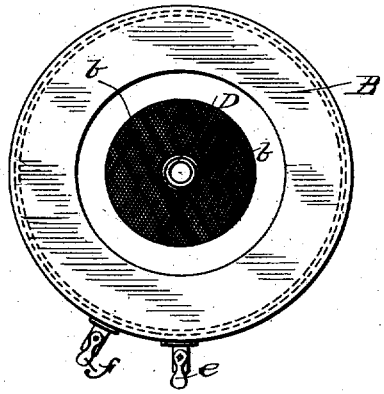
Fig. 3.
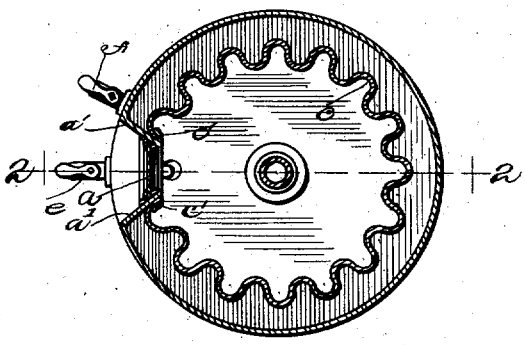
Witnesses:
J. B. Weir
M. E. Shields
Inventor
Edward S. Cushman
By Raymond & Barnett
Atty's
THE NORRIS PETERS CO., PHOTO-LITHO., WASHINGTON, D. C.

UNITED STATES PATENT OFFICE.

EDWARD S. CUSHMAN, OF CENTERVILLE, IOWA.

COOLING-CAN.

SPECIFICATION forming part of Reissued Letters Patent No. 11,966, dated February 4, 1902.

Original No. 681,876, dated September 3, 1901. Application for reissue filed November 30, 1901. Serial No. 84,290.

*To all whom it may concern:*

Be it known that I, EDWARD S. CUSHMAN, a citizen of the United States, residing at Centerville, in the county of Appanoose and State of Iowa, have invented certain new and useful Improvements in Cooling-Cans, of which the following is a specification.

My invention, although adapted for use wherever it is desired to rapidly cool a liquid without bringing it in actual contact with the cooling medium, is especially adapted and intended for use as a milk-cooler and cream-separator, in which warm fresh milk may be rapidly chilled to a temperature which facilitates the separation of the cream from the milk, it being well understood that such separation is rapidly promoted by chilling the milk in any convenient manner, the most simple means being the thorough mixture with the warm milk of a sufficient quantity of cool water.

The prime object of my invention, however, is to facilitate such chilling and separation without diluting the milk, the advantages of which are obvious.

Another object of my invention is to produce such a cooling apparatus which shall be compact, convenient, simple in construction, durable, easily kept thoroughly sweet and clean, (a consideration of prime importance in a milk-cooler,) and not liable to readily get out of repair.

While I am aware that it is not broadly new with me to produce a double cooling-can for the purposes named, I believe that in my construction, as hereinafter described, I have produced such a can which meets the objects above specified more thoroughly and efficiently than anything now known in this art.

The above and such other objects as may hereinafter appear are accomplished by the device shown in the accompanying drawings, in which—

Figure 1 is an elevation of my improved cooling-can. Fig. 2 is a vertical section of the same on the line 2 2 of Fig. 3, showing in dotted lines the lid removed from the can. Fig. 3 is a horizontal section on the line 3 3 of Fig. 2, and Fig. 4 is a plan view of my can with the cover on.

Similar letters of reference indicate the same parts in the several figures of the drawings.

Referring by letter to the accompanying drawings, A is a can having an inwardly-bent portion, at the back of which portion is a glass panel or gage-glass *a*, and B is a lid or cover having its middle portion depressed and provided with a strainer *b*, said strainer surrounding an upwardly-extending tube or collar *b'*.

C is an inner can of considerably smaller diameter than the can A. The walls of the inner can C are deeply indented or corrugated, so as to form a large cooling-surface, and are securely soldered at the points *c'* to the inner ends of the inwardly-bent walls *a'*. The glass panel or gage-glass *a* is secured between the inner ends of these walls *a'*, so as to form at this point a part of the wall of the inner can C. The inner can C is also provided with a vertical tube D, which extends entirely through the inner can C and opens into the space between the bottom of the can C and the bottom of the can A. The tube D extends upwardly through the tube or collar *b'* on the lid B. The bottom of the can C is formed so as to slope toward the glass panel *a* and is provided at the lower end of its sloping bottom with a small depression, which connects with the faucet *e*.

My device is used as follows: The fresh milk is poured into the depression in the lid B without any particular care and immediately passes through the strainer *b* into the interior of the can C. Cold water of the desired temperature is then poured into the pipe D by means of a funnel or in any other convenient manner and immediately passes into the interspace between the walls and bottoms of the cans A and C and fills this interspace, as well as the interior of the tube D. Because of the large cooling-surfaces afforded by the corrugated walls of the can C, as well as by the central column of cool water in the tube D, the rapid cooling effect so much desired to promote the ready separation of the cream from the milk is readily obtained, and the rising of the cream quickly follows. As the glass gage *a* forms a part of the wall of the can C, the rising of the cream can be observed from time to time, and whenever it has sufficiently risen the milk, undiluted with water, can be drawn off through the milk-faucet *e* until it is observed through the glass gage that all of the milk has been drawn off and the can C contains nothing but cream, whereupon the faucet *e* may be closed, the skimmed milk removed, the faucet *e* reopened, and the cream drawn off. By virtue of the sloping bottom of the can C and the small additional depression, with which the milk-faucet *e* makes immediate connection, it becomes a simple matter in this manner to draw off all of the skimmed milk without wasting any of the cream. When through using the can, the warmed water may be drawn off through the faucet *f* without removing the can, or under conditions where the water may become warm more rapidly than is desirable to procure the best results in separating the cream the water-faucet *f* may be left open and a constant supply of fresh cool water introduced at the top of the tube D, thereby producing a circulation of cool water and keeping a continuous fresh supply of cool water in the tube D and in the interspace between the cans A and C, whereby the milk may be rapidly cooled and kept cold, so as to produce the most satisfactory results.

Having thus described my invention, what I claim, and desire to secure by Letters Patent, is—

1. The combination in a cooling-can, of a water-can, a milk-can located within said water-can so as to provide an interspace between the walls and bottoms of said milk-can and said water-can, a vertical panel formed by turning in the walls of said water-can and joining the edges of said turned-in portion to the walls of said milk-can, and a gage-glass located at the back of said panel so as to form a portion of the wall of said milk-can, substantially as described.

2. A cooling-can comprising an outer shell, an inner shell or can so located as to provide an interspace between the walls and bottoms of the outer and inner shells, a lid adapted to fit over said outer shell and provided with a depressed portion leading solely to said inner can, said depressed portion forming a cover for said inner can, an inner tube extending downward through said inner can and the bottom thereof and opening into the space between said inner and outer cans, and a vertical collar fitting over the upper end of said inner tube, said collar having an annular flange, substantially as described.

3. A cooling-can, comprising an outer shell, an inner shell or can so located as to provide an interspace between the walls and bottoms of the outer and inner shells, the walls of said inner shell being corrugated vertically the entire length of said walls, a lid adapted to fit over said outer shell and provided with a depressed portion having a strainer at the bottom thereof, an inner tube extending downward through said inner can and the bottom thereof and opening into the space between said inner and outer cans, and a vertical collar fitting over the upper end of said inner tube, said collar having an annular flange forming the inner seat for the strainer, said cover, strainer and collar serving to support the upper end of said tube against lateral movement and strain, substantially as described.

EDWARD S. CUSHMAN.

Witnesses:
A. KIRKPATRICK,
ORA DIMMITT.